Nov. 6, 1934.   J. FERGUSON   1,979,610
APPARATUS AND PROCESS FOR HEATING GLASS FURNACE FOREHEARTHS
Filed June 5, 1933    2 Sheets-Sheet 1
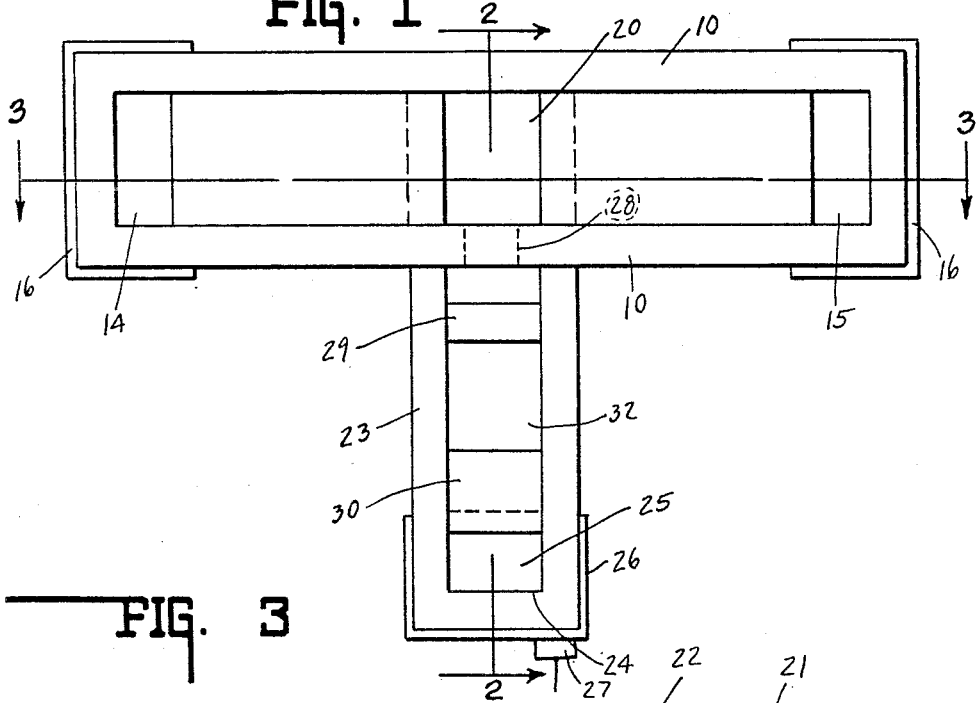
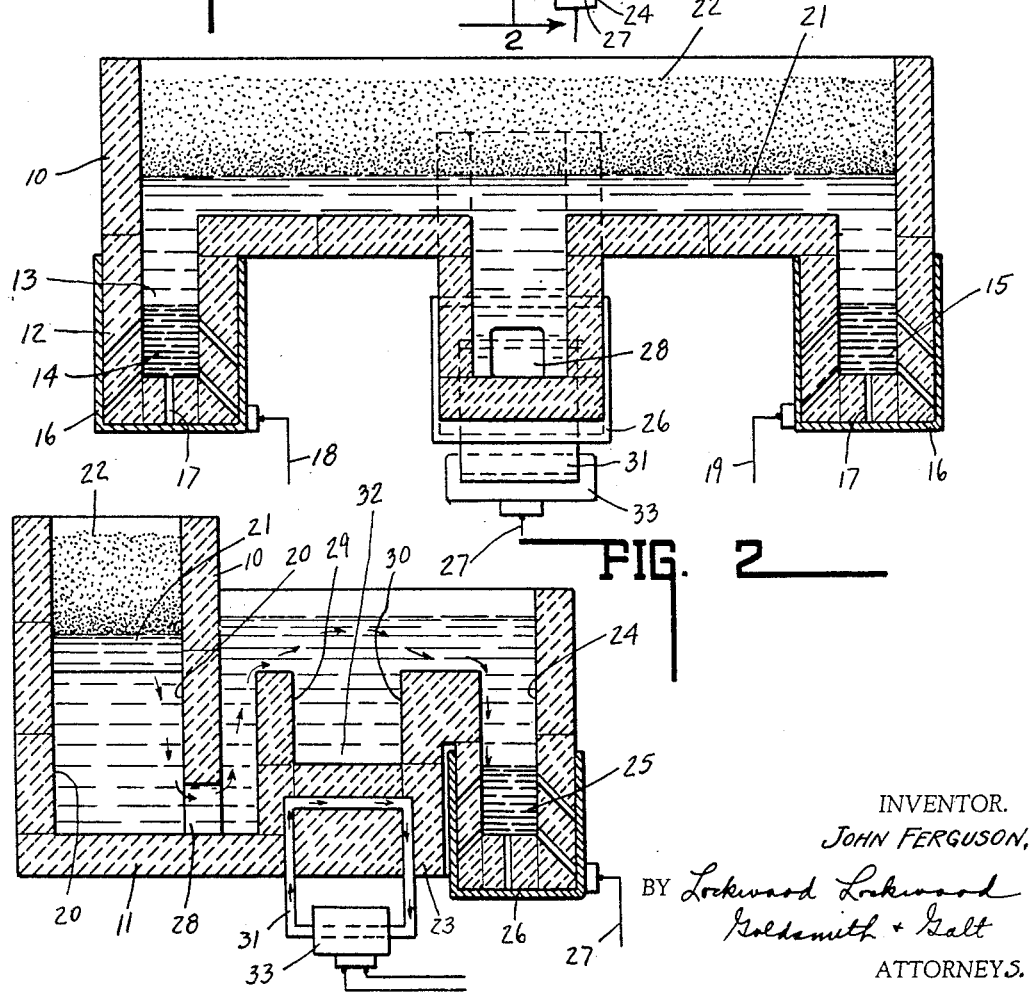
INVENTOR.
JOHN FERGUSON,
BY Lockwood Lockwood
Goldsmith & Galt
ATTORNEYS.

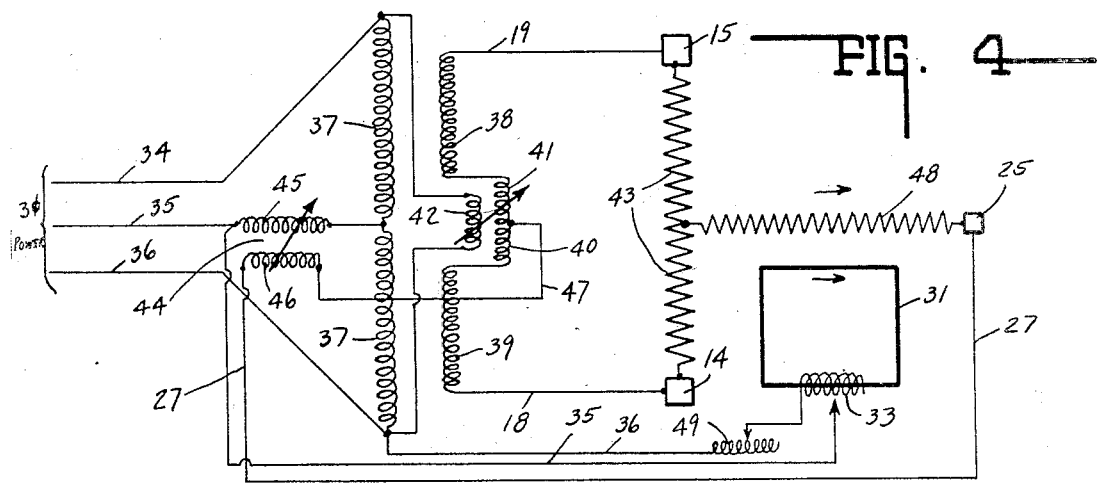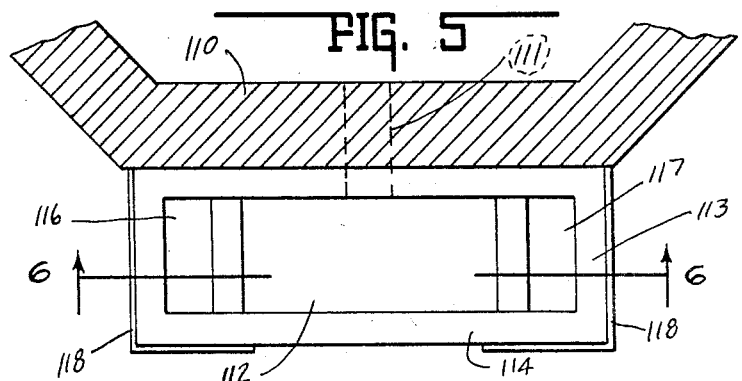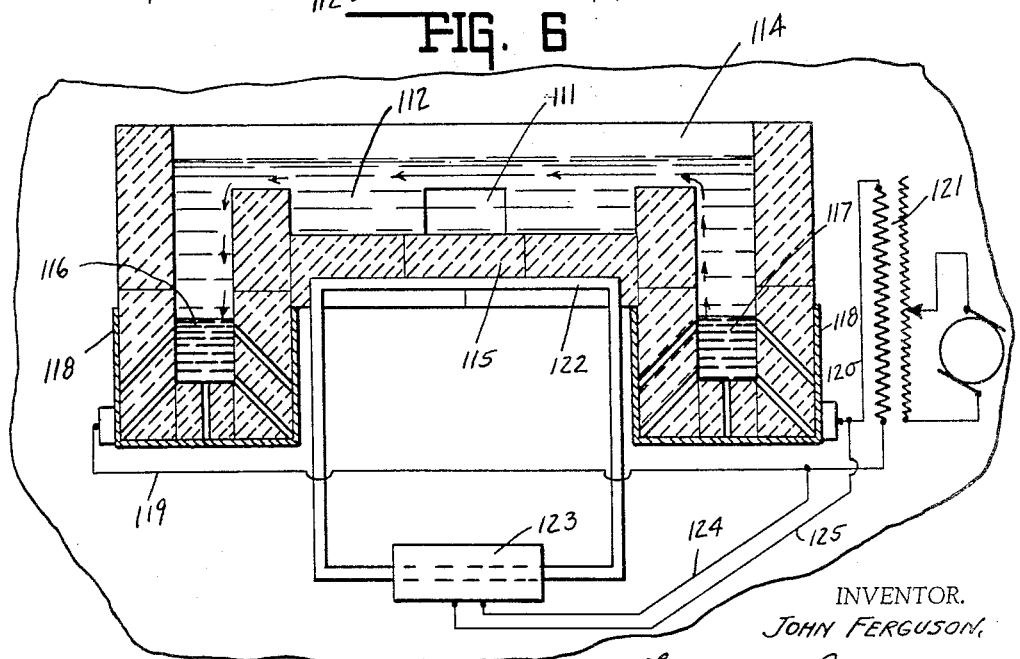

Patented Nov. 6, 1934

1,979,610

UNITED STATES PATENT OFFICE 1,979,610

APPARATUS AND PROCESS FOR HEATING GLASS FURNACE FOREHEARTHS

John Ferguson, Indianapolis, Ind., assignor to Fairmount Glass Works, Indianapolis, Ind., a corporation Application June 5, 1933, Serial No. 674,303

7 Claims. (Cl. 13—34)

This invention relates to an electrically-heated forehearth for a glass furnace, and particularly wherein it is adaptable for use in connection with vacuum or suction feed for molds.

In the use of suction feed molds in the manufacture of glassware, the molds pass over the top of the forehearth and engage with the surface of the molten glass contained therein for sucking or dipping up the glass into the mold. The difficulties occasioned by this method of feeding reside in the necessity of keeping the glass hot prior to fabrication. Heretofore, the glass in the forehearth has been directly heated by oil or gas fire or indirectly by gas fire using a pot or crucible to contain the glass. One difficulty experienced by such methods has been that the glass temperature throughout the main body of the glass has not been uniform and particularly the surface of the glass has been cold. Furthermore, the contact of the suction apparatus or molds with the upper exposed surface of the molten glass tends to chill it, producing a crust of higher viscosity than is desirable for feeding the molds. This has resulted in striation and to some extent the inability to expel the finer small gas bubbles or seed. Thus, it is desirable, wherein the upper surface of the molten glass is exposed to the atmosphere and to the suction apparatus, that it be maintained at as great or greater heat and fluidity than the under mass.

It is the object of this invention to provide a forehearth wherein the upper exposed surface of the molten glass may be conveniently heated to the desired degree for maintaining its proper characteristics desirable for a suction feed through the medium of electrical heating involving some principles as set forth and described in my copending application Serial No. 627,706, filed August 6, 1932, entitled Electric melting and refining furnace.

This invention contemplates the use of electric power to heat the glass in the forehearth embodying the principles set forth in the above-mentioned application, as applied to the furnace itself. This is accomplished primarily by providing a plurality of electrodes either in the forehearth independently of the furnace or in conjunction therewith, whereby a current of electricity may be passed through the forehearth for heating purposes. The resistance of the molten glass therein, as discussed in the above-mentioned application, to the passage of the current maintains the glass at a high temperature which may be readily, and, in fact, is automatically controlled.

For the purpose of highly heating the upper exposed surface of the molten glass to the maximum desired temperature for handling thereof by the molds, it is desirable that the principal path of the electrical current passing therethrough be maintained along the surface of the glass or adjacent thereto.

One of the features of the present invention is to provide means for maintaining the principal path of the electric current adjacent the surface of the molten glass. This is accomplished by providing bridges extending upwardly to a position near the surface over which the current must pass from one electrode to another. In addition thereto, a repellant current is set up through the medium of a loop associated with the bottom of the forehearth through which a substantial current of electricity is passed in the same relative direction as the current passing through the glass to set up repellant forces.

By means of this arrangement and method of directing the principal current passing through the glass, said current is repelled to the most extreme possible distance from the underlying loop while confined to the glass, wherefore its path will be adjacent the surface thereof, resulting in the maximum surface heat being maintained.

The full nature of the invention will be understood from the accompanying drawings and the following description and claims:

In the drawings, Fig. 1 is a schematic plan view of an electric furnace of the character disclosed in the above-mentioned application having an electrically heated forehearth. Fig. 2 is a section taken on the line 2—2 of Fig. 1. Fig. 3 is a section taken on the line 3—3 of Fig. 1. Fig. 4 is a wiring diagram as applied to both the furnace and the forehearth. Fig. 5 is a plan view of a modified form showing a section of the usual type of furnace having an electrically heated forehearth associated therewith. Fig. 6 is a section taken on the line 6—6 of Fig. 5.

In the drawings, there is illustrated an electric glass furnace comprising the walls 10 and bottom 11, built of suitable refractory material. At each end of the furnace the refractory material extends downwardly to form a projection 12 for providing a well 13 communicating with the interior of the furnace. Located in the wells 13 there are electrodes 14 and 15 which comprise molten metal, such as lead. Each of the projections 12 is surrounded by a heat resisting jacket 16 of an impervious material, such as steel or other dense refractory material. Communicating between the well and the jacket there may be provided small passageways 17 through which the molten lead may seep to provide electrical conduction between the jacket and the lead. It will be noted that the jacket 16 extends upwardly about the projection 12 to a point above the upper level of the molten electrode to prevent leakage. Each of the electrodes 14 and 15 are connected through their respective jackets 16 in a circuit through the lead wires 18 and 19, respectively. Current for the operation of the furnace is supplied therethrough as will be hereinafter pointed out in reference to the wiring diagram illustrated in Fig. 4.

There is provided in the bottom of the furnace an intermediate well 20, the furnace containing a supply of molten glass 21 thereabove upon which the glass forming material or batch 22 is superimposed.

Extending from the side of the furnace intermediate the ends thereof and embracing the well 20 there is a forehearth 23 having a well 24 in which an electrode of molten lead or the like 25 is positioned. Said well is surrounded by a steel jacket 26, as above described, which is electrically connected to a lead wire 27. Adjacent the bottom of the well 20 in the furnace there is a passageway 28 communicating with the adjacent end of the forehearth immediately below the side wall 10. The forehearth is provided with a pair of bridges 29 and 30 which extend upwardly toward the glass level. The inner bridge 29 is slightly spaced from the wall 10 of the furnace so as to permit the glass to flow from the furnace into the forehearth through the passage 28 adjacent the bottom and upwardly over the top of the bridge 29.

Suspended from the bottom of the forehearth and supported therefrom there is a loop of heavy metal, preferably copper strap 31, the upper portion of which may be imbedded in the refractory material of the bottom between the bridges 29 and 30. The loop extends in a vertical plane and preferably is formed of copper strap several inches wide and a quarter of an inch or more thick. Said loop is immediately below the glass well 31 formed by the space intermediate the bridges. Said loop forms the secondary of a transformer, the primary of which transformer comprises the loop or winding 33.

In Fig. 4 there is illustrated diagrammatically a preferred form of wiring by means of which the heating current is supplied both to the furnace and the forehearth and the regulation of both currents is independently accomplished, although the two circuits are interconnected and include the same furnace electrodes. Power is supplied from any suitable source of three phase alternating current on the three power mains 34, 35 and 36. The mains 34 and 36 are connected to the opposite ends of the primary winding 37 of a transformer having two secondary windings 38 and 39, one end of winding 38 being connected to the furnace electrode 15 through conductor 19, while the opposite end of winding 39 is connected by conductor 18 to the furnace electrode 14. The secondary winding 40 of an induction voltage regulator 41 is interposed in series between the secondary windings 38 and 39. The primary winding 42 of the said regulator is connected across the power mains 34 and 36. The secondary circuit for melting the glass in the furnace thus includes the terminal 15, conductor 19, windings 38, 40 and 39, conductor 18, and terminal 14, and is completed through the charge in the furnace, whose resistance is indicated at 43 in the diagram. The voltage applied to the terminals 14 and 15 is regulated by means of the regulator 41 in this circuit to insure proper melting of the batch and proper regulation of the temperature of the glass in the furnace. While the well known induction regulator is preferred for this purpose, any suitable type of variable voltage transformer may be used.

For supplying the current for heating the forehearth, there is provided an induction voltage regulator or variable voltage transformer 44 having its primary winding 45 connected to the third power main 35 and to the midpoint of the primary winding 37. The secondary winding 46 thereof is connected at one end by a conductor 47 to the midpoint of the secondary winding 40 of the furnace voltage regulator 41 and at the other end to the forehearth electrode 25. The resistance of the forehearth charge is indicated in the diagram at 48. There is thus formed a secondary circuit for the forehearth heating current including conductor 47, winding 46, conductor 27, electrode 25, and resistance 48, said circuit being completed through two parallel paths, one through electrode 15, conductor 19, and windings 38 and 40 to conductor 47, and the other through electrode 14, conductor 18, and windings 39 and 40 to conductor 47.

Because of the connection of winding 45 to the midpoint of winding 37 the voltage induced in the secondary winding 46 is always in phase quadrature with that induced in windings 38 and 39, no matter what the relative values of these voltages may be. Therefore, the T-connection of the three secondary windings 46, 38 and 39 and the fact that the furnace and forehearth together form a T-shaped resistor having approximately the same resistance in both arms of the resistance 43, insures that the voltage between the electrode 25 and the midpoint of the resistance 43 will be in phase quadrature with that between electrodes 14 and 15. In other words, the three phase power supply has been transformed into a two phase secondary system with the phases in quadrature. Under these conditions the current passing through the forehearth resistance 48 will be equally divided between the two electrodes 14 and 15 and does not disturb the balance of the heating current in the two ends of the furnace. The amount of the forehearth current may be varied at will by means of the regulator 44 without altering the voltage phase relation or materially affecting the heating of the furnace proper.

For supplying the repelling current in the loop 31, a branch of the power main 36 is connected to a variable inductance 49 in turn connected to a terminal of the primary winding 33. The opposite terminal of said winding is connected to a branch of power main 35. The voltage supplied to the circuit for the primary winding 33 is thus out of phase with that applied to resistance 48, but the current in said circuit may be brought into proper phase relation to that in resistance 48 by suitable adjustment of the variable inductance 49. The proper adjustment is reached when the current in said loop exerts the maximum repelling force upon that in the forehearth.

In certain cases, when the induction of the transformer formed by winding 33 and loop 31 is sufficiently small to cause no great current lag, the winding 33 may be connected directly across the primary winding 45 or the secondary winding 46 whose voltage is in phase with that across resistance 48. In these cases, the current in loop 31 is substantially in phase with that in resistance 48 without further adjustment.

Several methods of starting the electric furnace 10 may be employed, as suggested in the above-mentioned application, one being to fill it with broken glass and temporarily supply an oil flame thereto until the glass has melted sufficiently to conduct the electric current from one electrode to the other, whereupon the glass will soon be heated to the desired temperature and become a molten fluid. Assuming that the furnace is in operation and the current passing through the glass of the furnace from the electrode 14 to the electrode 15, the molten glass contained therein will flow through the passage 28 at the bottom of the well 20 into the forehearth over the bridge 29, reaching a slightly higher level than the level of the glass in the furnace. The variation in level is due to the fact that the batch adds a certain weight to the glass in the furnace which is compensated for by the higher level in the forehearth. The current being applied through the furnace, it will flow therefrom to the electrode 25, or longitudinally of the forehearth, thus heating the molten glass contained therein. However, the surface of the glass in the forehearth being exposed, there would normally be a loss of heat, such as to maintain the temperature at a lower degree than that of the furnace, wherein the batch provides substantial heat insulation.

It is well understood that the electric current takes the most direct course from one electrode to another. Thus it will pass through the passageway 28 and be carried above the bridges 29 and 30, reaching a level near the upper surface of the glass.

The current passing through the loop 31 in the same direction as that passing through the forehearth will have a repellant power which will further force the path of the current toward the upper glass level, as suggested by the dotted lines of Fig. 2. Thus, by this arrangement and method of heating the glass and directing the path of the current therethrough, the maximum heat and fluidity will be maintained adjacent the surface for facilitating the feeding thereof.

The cross sectional area of loop 31 will permit a current of 1000 or more amperes to be passed therethrough. There may be several terminals on the primary loop 32 so that the primary winding may be connected to a 220 volt circuit and the number of active turns thereof may be varied by connecting to the proper terminals. The ratio between the primary and secondary loops will govern the amount of current which flows in the loop 31. This means that an extremely heavy current may be developed in the loop 31 at a very small voltage. The power consumption at 1000 or more amperes will be about 250 watts and the voltage within the loop will, therefore, be only approximately a one-quarter volt. By changing and adjusting the current in loop 31, the temperature of any part of the glass well may be controlled.

Another advantage of the construction of the forehearth, and particularly the employment of the bridge 29, is that by compelling the glass to pass thereover at a very shallow depth, the temperature of the bridge will be sufficiently high to cause any small bubbles or seed remaining in the glass after discharged from the furnace to escape at this point before passing into the well.

It may be also pointed out that the application of this method of heating the surface of the forehearth will result in something of a stirring or agitating action of the glass contained in the well. This results by reason of the fact that the current travelling along the lower layers of glass in a relative small volume will be repelled to the upper surface by the action of the loop, carrying along with it particles of glass from the lower layers. This will stimulate movement in the mass of glass by electrical means to promote homogeneity therein.

The modified form, as illustrated in Figs. 5 and 6, discloses the application of an electrically-heated forehearth to the usual type of fuel-heated furnace, wherein there is illustrated the front wall 110 of a furnace having a passageway 111 leading to the well 112 of the forehearth comprising the end wall 113, side front wall 114, and bottom 115. As set forth, the forehearth is provided with end wells containing the electrodes 116 and 117. The jackets 118 in electrical contact with the electrodes are connected by the leads 119 and 120 to the secondary of a variable-voltage step-down transformer 121, for causing current to pass through the molten glass.

Suspended in any suitable manner from the bottom 115 is the above-described secondary loop 122 of heavy copper strap associated with the primary loop 123 connected by the leads 124 and 125 to the leads 119 and 120, respectively, in such manner that the current will pass through the secondary circuit 122 in the same direction as it passes through the forehearth to produce a repellant action for the purpose above described.

The invention claimed is:

1. A reservoir for containing molten glass, means for passing an electric current through said molten glass for heating the same, means for conducting an auxiliary electric current adjacent to the glass, and means for varying the effective forces between said currents for controlling the position of the path of the heating current through the glass.

2. A reservoir for containing molten glass, means for passing an electric current through said molten glass for heating the same, a metallic loop secured to the underside of said reservoir and extending in a plane through the path of the heating current, means for generating a current through said loop, and means for controlling the current through said loop for varying its effective force on said heating current.

3. A reservoir for containing molten glass, electrodes associated therewith below the surface of the molten glass, means for passing a current through the glass from one electrode to another, a bridge extending upwardly through said glass toward the upper surface thereof over which said current must pass, and means for passing an electric current in the same direction below the glass and insulated therefrom for repelling the current passing over said bridge to cause it to seek a path adjacent the upper level of the glass.

4. In an electrically heated glass melting furnace, electrodes at opposite sides thereof, a forehearth associated with said furnace into which molten glass is adapted to flow therefrom, an electrode adjacent the far end of said forehearth, means for causing an electric heating current to pass between said electrodes for maintaining the molten glass at a high temperature, means for varying the amount of the current passing through the forehearth relative to the amount of current passing through the furnace, and an auxiliary circuit associated with said forehearth through which current is adapted to pass for controlling the relative position of the path of the heating current therein with respect to the surface of the glass.

5. The method of controlling temperature of molten glass contained within a reservoir, consisting in passing an electric heating current therethrough in a given direction, and controlling the position of the path of the heating current relative to the surface of the glass by an auxiliary electric current insulated therefrom.

6. The method of maintaining the surface of molten glass contained in a forehearth at a high temperature, consisting in passing an electric current therethrough for heating the same, and causing an auxiliary current adjacent to but insulated therefrom to flow in such direction relative to the heating current as to cause it to take a path adjacent the surface of the molten glass.

7. The method of maintaining the surface of molten glass contained in a forehearth at a high temperature, consisting in passing an electric current therethrough in one direction for heating the same, and causing an auxiliary current to flow in the same direction below the forehearth for repelling the heating current and forcing it to take a path through the molten glass adjacent the surface thereof.

JOHN FERGUSON.